United States Patent Office 2,705,195
Patented Mar. 29, 1955

2,705,195

HERBICIDAL COMPOSITIONS AND METHODS EMPLOYING SOLUTIONS OF SUBSTITUTED UREAS IN MONOHYDRIC PHENOLS

Harold E. Cupery, New Castle County, and Norman E. Searle and Charles W. Todd, Wilmington, Del., assignors to E. I. du Pont de Nemours & Company, Wilmington, Del., a corporation of Delaware No Drawing. Application September 27, 1951,
Serial No. 248,652

15 Claims. (Cl. 71—2.6)

This invention relates to herbicidal compositions. More particularly, it relates to compositions comprising solutions in a phenol of a urea represented by the formula (1)

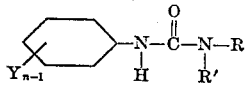

wherein Y is selected from the group consisting of chlorine, bromine, nitro, and alkyl containing 1 to 6 carbon atoms inclusive, $n$ is an integer from 1 to 4 inclusive, R is alkyl containing 1 to 2 carbon atoms inclusive, and R' is a radical from the group consisting of hydrogen and alkyl containing 1 to 2 carbon atoms inclusive. Preferably Y is chlorine or alkyl containing 1 to 2 carbon atoms inclusive.

This application is a continuation in part of our copending application, Serial No. 186,118, filed September 21, 1950, which application was, subsequent to the filing of the present application, converted to a sole application of one of us, and is now abandoned.

The ureas defined above are outstandingly effective herbicidal agents. They are, however, only slightly soluble in the solvents commonly used as carriers or diluents for herbicidal agents. Their herbicidal utility is disclosed in the aforementioned copending application, which application claims the ureas in admixture with non-solvent carriers and with surface-active agents. The present application relates more narrowly to herbicidal compositions employing such ureas in solution and more specifically in solution in a phenol.

The ureas of the compositions of the invention can be prepared by conventional methods, for example, by reaction of a primary or secondary aliphatic amine with an appropriate aromatic isocyanate. The following equation illustrates (2)

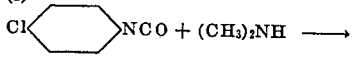

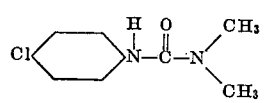

The amine-isocyanate reaction can be readily carried out by first adding the isocyanate reactant to an inert solvent such as toluene, benzene, chlorobenzene, or dioxane at about room temperature followed by gradual addition of the amine reactant. The reaction is exothermic and is conveniently carried out in the temperature range of 25 to 75° C. The urea reaction products employed in the compositions and methods of the invention are white crystalline solids and they ordinarily separate out from the reaction mass on cooling.

Illustrative of the urea compounds employed in the composition and methods of the invention are:

3-phenyl-1,1-dimethylurea
3-(p-chlorophenyl)-1,1-dimethylurea
3-(m-chlorophenyl)-1,1-dimethylurea
3-(3,4-dichlorophenyl)-1,1-dimethylurea
3-(2,5-dichlorophenyl)-1,1-dimethylurea
3-(p-bromophenyl)-1,1-dimethylurea
3-(p-nitrophenyl)-1,1-dimethylurea
3-(3-chloro-p-tolyl)-1,1-dimethylurea
3-(3,5-dichloro-p-tolyl)-1,1-dimethylurea
3-(3,4,5-trichlorophenyl)-1,1-dimethylurea
3-p-tolyl-1,1-dimethylurea
3-(p-isohexylphenyl)-1,1-dimethylurea
3-(p-n-propylphenyl)-1,1-dimethylurea
3-(3,4-xylyl)-1,1-dimethylurea
3-phenyl-1-methylurea
3-(p-chlorophenyl)-1-methylurea
3-(3,4-dichlorophenyl)-1-methylurea
3-(3-chloro-p-tolylphenyl)-1-methylurea
3-(3,4,5-trichlorophenyl)-1-methylurea
3-p-tolyl-1-methylurea
3-(p-isohexylphenyl)-1-methylurea
3-phenyl-1,1-diethylurea
3-(p-chlorophenyl)-1,1-diethylurea
3-(3,4-dichlorophenyl)-1,1-diethylurea
3-(m-nitrophenyl)-1,1-diethylurea
3-(3,5-dichloro-p-tolyl)-1,1-diethylurea
3-(3,4,5-trichlorophenyl)-1,1-diethylurea
3-p-tolyl-1,1-diethylurea
3-(m-sec.-butylphenyl)-1,1-diethylurea
3-(3,4-dibromophenyl)-1,1-diethylurea
3-phenyl-1-ethylurea
3-(p-chlorophenyl)-1-ethylurea
3-(3,4-dichlorophenyl)-1-ethylurea
3-(3,4,5-trichlorophenyl)-1-ethylurea
3-p-tolyl-1-ethylurea The preferred ureas are:

3-phenyl-1,1-dimethylurea
3-(p-chlorophenyl)-1,1-dimethylurea
3-(3,4-dichlorophenyl)-1,1-dimethylurea
3-p-tolyl-1,1-dimethylurea
3-(p-chlorophenyl)-1-methylurea The ureas employed in the compositions of the invention have relatively high solubilities in all phenols although it will be appreciated, of course, that there is a wide variation in maximum solubility depending upon the particular urea and phenol used.

The phenols used are monohydric and preferably monocyclic, and have relatively low melting points, so that upon solution of the urea therein there is obtained a composition that remains in a liquid form at normal temperatures of use. The suitability of any given phenol as a solvent for any of the ureas to give a liquid solution at ordinary temperatures can easily be determined by a simple test tube solubility test. In general, in the preparation of liquid compositions, it will usually be found advantageous to employ a phenol having a melting point below about 50° C. Higher melting phenols can be used, however, if desired.

Illustrative of phenols suitable for use in the compositions of the invention are:

Phenol
o-, m-, and p-cresol
o-, m-, and p-chlorophenol
2,4,6-trichlorophenol
2,3-, 2,4-, 2,5-, and 2,6-dimethylphenol
3,4-, and 3,5-dimethylphenol
o-, m-, and p-ethylphenol
o-, m-, and p-propylphenols
o-, m-, and p-butylphenols
o-, m-, and p-amylphenols
o-, m-, and p-bromophenol
2,3-, 2,4-, 2,5-, and 2,6-dichlorophenol
3,4- and 3,5-dichlorophenol A single phenol can be used as the solvent in preparing compositions of the invention or, alternatively, a combination of the phenols can be used. Mixtures consisting wholly or principally of phenols such, for example, as cresols, xylenols, creosote and tar acid oils are especially valuable. Cresol and xylenols and mixtures of the several isomeric forms of cresol and xylenol are especially preferred.

Solutions of the invention can be made according to conventional practices for obtaining solution of a solid in another material. Thus, for example, the urea can be added slowly either in solid or liquid form to an agitated body of a hot liquid phenol.

The amount of urea mixed with the phenol can be varied as desired. The amount of urea included need not be limited by its solubility in the phenol if it is not objectionable to have some undissolved urea in the composition for the intended use. Generally, however, it will be preferred to limit the amount of urea so as not to exceed the amount that will remain in the solution in the phenol. The maximum amount of urea that will dissolve varies widely with different ureas and phenols but will generally be within the range of about 0.05 to 1 part by weight of urea for each part by weight of phenol at room temperature. More dilute solutions can be prepared as desired.

According to a preferred embodiment of the invention, there is mixed with the solution of a urea in a phenol a surface-active agent of the type used to impart dispersibility of organic compositions in water. Such agents when used in admixture with organic liquid compositions are sometimes referred to in the art as emulsifying agents since the dispersion of the organic liquid in water which they promote is an emulsion.

Where there is desired a water-dispersible liquid solution of a urea in a phenol, the dispersing or emulsifying agent used is preferably one that is soluble in the solution. Typical of such agents are the amine salts of oleic acid, the sulfonated animal and vegetable oils such as sulfonated fish and castor oils, sulfonated petroleum oils, glycerol monostearate, sorbitan tristearate, diglycol oleate, diethylene glycol laurate, pentaerythritol monostearate, phthalic glycerol alkyd resins, and polyethylene oxides.

Other dispersing or emulsifying agents are listed in detail in U. S. Department of Agriculture Bulletin, E 607 and in an article by McCutcheon in Chemical Industries, November 1947, page 811, entitled "Synthetic Detergents."

The amount of dispersing or emulsifying agent used in the compositions of the invention to impart water dispersibility will vary with the dispersing properties of the particular agent used and will be varied too with the particular use for which the composition is intended. Generally, the dispersing agent will not comprise more than about 10% by weight of the composition and with the better dispersing agents, the percentage will be 5% or less.

The solutions of a urea in a phenol can also be mixed with other organic liquid diluents such as hydrocarbons, chlorinated hydrocarbons and alkylated naphthalenes.

The usual methods for application of herbicidal products can be suitably employed in applying compositions of the invention. Thus, liquid solutions of a urea in a phenol can be sprayed directly to an area or locus to be protected from weed infestation using conventional spray equipment. If it is preferred to apply the herbicidal product from an aqueous composition, then compositions of the invention containing an emulsifying agent can be dispersed in water to a desired concentration for spray application.

The invention is illustrated further by reference to the following examples.

*Example I*

A herbicidal composition of the invention in the form of an emulsifiable oil concentrate is prepared by dissolving 3-phenyl-1,1-dimethylurea and an emulsifying agent in cresol heated to a temperature of about 85–95° C. in amounts to give a solution having the following composition:

| | Per cent |
|---|---|
| 3-phenyl-1,1-dimethylurea, technical | 40 |
| Diethyl cyclohexylamine dodecyl sulfate (emulsifying agent) | 5 |
| Cresol, technical | 55 |

The composition of this example is a liquid and it remains liquid under temperatures down to 0° C. The composition is suitable for application to unwanted plant growth directly, or alternatively, it is readily emulsified in water or in a paraffin oil to provide a more dilute spray composition where desired.

*Example II*

A herbicidal composition of the invention in the form of an emulsifiable oil concentrate is prepared by dissolving 3-(p-chlorophenyl)-1,1-dimethylurea and an emulsifying agent in cresol heated to a temperature of about 85–95° C. in amounts to give a solution which is then diluted by the addition of alkylated naphthalenes to give a solution having the following composition:

| | Per cent |
|---|---|
| 3-(p-chlorophenyl)-1,1-dimethylurea | 10 |
| Alkylated aryl polyether alcohol (emulsifying agent) | 1 |
| Cresol | 25 |
| Alkylated naphthalenes | 64 |

The composition of this example is a liquid, and it remains liquid under temperatures down to 0° C. The composition is especially suitable for application to unwanted plant growth directly.

In the examples that follow, solutions are made by dissolving a urea in a phenol while heating to assist solubility, the percentages shown being by weight, and in each case the resulting product is a liquid at room temperature and is adapted for use as a herbicide.

*Example III*

| | Per cent |
|---|---|
| 3-(3,4-dichlorophenol)-1,1-dimethylurea | 20 |
| Polyoxy ethylene sorbitol laurate | 5 |
| Phenol | 25 |
| Cresol, technical | 50 |

*Example IV*

| | Per cent |
|---|---|
| 3-p-tolyl-1,1-dimethylurea | 15 |
| Xylenol, technical | 85 |

*Example V*

| | Per cent |
|---|---|
| 3-(p-chlorophenyl)-1,1-dimethylurea | 25 |
| Alkylated aryl polyether alcohol (emulsifying agent) | 5 |
| Cresol, technical | 70 |

*Example VI*

| | Per cent |
|---|---|
| 3-(p-chlorophenyl)-1-methylurea | 30 |
| 2,4-dichlorophenol | 70 |

3-(p-chlorophenyl)-1,1-dimethylurea and closely related 3-(halogenoaryl)-1,1-dialiphatic hydrocarbon ureas, and 3-(3,4-dichlorophenyl)-1,1-dimethylurea and closely related 3-(m-chlorophenyl)-1,1-dialiphatic hydrocarbon ureas, some of which are disclosed herein, are claimed in a coassigned copending patent of Charles W. Todd, U. S. 2,655,445, patented October 13, 1953.

We claim:

1. A herbicidal composition comprising a solution in a monohydric phenol of a urea represented by the formula

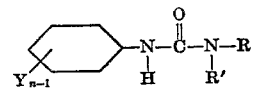

wherein Y is selected from the group consisting of chlorine, bromine, nitro, and alkyl containing 1 to 6 carbon atoms inclusive, n is an integer from 1 to 4 inclusive, R is alkyl containing 1 to 2 carbon atoms inclusive, and R' is a radical from the group consisting of hydrogen and alkyl containing 1 to 2 carbon atoms inclusive, said urea being present in the composition in a concentration sufficient to exert herbicidal action.

2. A herbicidal composition comprising, in admixture with a surface-active agent in quantity sufficient to impart water dispersibility to the composition, a liquid solution in a monohydric phenol of a urea represented by the formula

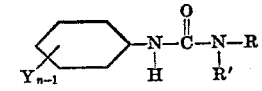

wherein Y is selected from the group consisting of chlorine, bromine, nitro, and alkyl containing 1 to 6 carbon atoms inclusive, n is an integer from 1 to 4 inclusive, R is alkyl containing 1 to 2 carbon atoms inclusive, and R' is a radical from the group consisting of hydrogen and alkyl containing 1 to 2 carbon atoms inclusive, said urea being present in the composition in a concentration sufficient to exert herbicidal action.

3. A herbicidal composition comprising, in admixture with an organic liquid diluent and a surface-active agent in quantity sufficient to impart water dispersibility to the composition, a liquid solution in a monohydric phenol of a urea represented by the formula

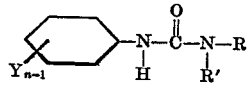

wherein Y is selected from the group consisting of chlorine, bromine, nitro, and alkyl containing 1 to 6 carbon atoms inclusive, $n$ is an integer from 1 to 4 inclusive, R is alkyl containing 1 to 2 carbon atoms inclusive, and R' is a radical from the group consisting of hydrogen and alkyl containing 1 to 2 carbon atoms inclusive, said urea being present in the composition in a concentration sufficient to exert herbicidal action.

4. A method for the destruction and prevention of weeds which comprises applying to a locus to be protected, in amount sufficient to exert herbicidal action, a herbicidal composition of claim 1.

5. A herbicidal composition comprising a solution of 3-(p-chlorophenyl)-1,1-dimethylurea in a monohydric phenol, 3-(p-chlorophenyl)-1,1-dimethylurea being present in the composition in a concentration sufficient to exert herbicidal action.

6. A herbicidal composition comprising, in admixture with a surface-active agent in quantity sufficient to impart water dispersibility to the composition, a liquid solution of 3-(p-chlorophenyl)-1,1-dimethylurea in a monohydric phenol, 3-(p-chlorophenyl)-1,1-dimethylurea being present in the composition in a concentration sufficient to exert herbicidal action.

7. A herbicidal composition comprising, in admixture with an organic liquid diluent and a surface-active agent in quantity sufficient to impart water dispersibility to the composition, a liquid solution of 3-(p-chlorophenyl)-1,1-dimethylurea in a monohydric phenol, 3-(p-chlorophenyl)-1,1-dimethylurea being present in the composition in a concentration sufficient to exert herbicidal action.

8. A herbicidal composition comprising a solution of 3-phenyl-1,1-dimethylurea in a monohydric phenol, 3-phenyl-1,1-dimethylurea being present in the composition in a concentration sufficient to exert herbicidal action.

9. A herbicidal composition comprising a solution of 3-(3,4-dichlorophenyl)-1,1-dimethylurea in a monohydric phenol, 3-(3,4-dichlorophenyl)-1,1-dimethylurea being present in the composition in a concentration sufficient to exert herbicidal action.

10. A herbicidal composition comprising, in admixture with a surface-active agent in quantity sufficient to impart water dispersibility to the composition, a liquid solution of 3-(3,4-dichlorophenyl)-1,1-dimethylurea in a monohydric phenol, 3-(3,4-dichlorophenyl)-1,1-dimethylurea being present in the composition in a concentration sufficient to exert herbicidal action.

11. A herbicidal composition comprising, in admixture with an organic liquid diluent and a surface-active agent in quantity sufficient to impart water dispersibility to the composition, a liquid solution of 3-(3,4-dichlorophenyl)-1,1-dimethylurea in a monohydric phenol, 3-(3,4-dichlorophenyl)-1,1-dimethylurea being present in the composition in a concentration sufficient to exert herbicidal action.

12. A herbicidal composition comprising a solution of 3-(p-chlorophenyl)-1-methylurea in a monohydric phenol, 3-(p-chlorophenyl)-1-methylurea being present in the composition in a concentration sufficient to exert herbicidal action.

13. A herbicidal composition comprising a solution of 3-p-tolyl-1,1-dimethylurea in a monohydric phenol, 3-p-tolyl-1,1-dimethylurea being present in the composition in a concentration sufficient to exert herbicidal action.

14. A method for the destruction and prevention of weeds which comprises applying to a locus to be protected, in amount sufficient to exert a herbicidal action, a herbicidal composition comprising a solution of 3-(p-chlorophenyl)-1,1-dimethylurea in a monohydric phenol.

15. A method for the destruction and prevention of weeds which comprises applying to a locus to be protected, in amount sufficient to exert herbicidal action, a herbicidal composition comprising a solution of 3-(3,4-dichlorophenyl)-1,1-dimethylurea in a monohydric phenol.

No references cited.